United States Patent [19]

Bear

[11] Patent Number: 4,584,807

[45] Date of Patent: Apr. 29, 1986

[54] COMPOSITE SOFFIT OF PLASTIC MATERIAL AND FURRING STRIPS

[76] Inventor: Richard W. Bear, 2021-5th Ave. SE., Cedar Rapids, Iowa 52403

[21] Appl. No.: 530,900

[22] Filed: Sep. 12, 1983

[51] Int. Cl.⁴ .............................................. F04C 1/00
[52] U.S. Cl. ..................................... 52/309.2; 52/220; 52/309.7; 52/368; 52/375; 52/372; 52/376; 52/373; 52/724; 52/727; 52/730
[58] Field of Search ................. 52/221, 222, 524, 220, 52/309.7, 503, 309.2, DIG. 8, 505, 372, 373, 649, 368, 375, 656, 376, 730, 423, 724, 725, 727, 728, 219; 312/245, 242, 253, 280, 213

[56] References Cited

U.S. PATENT DOCUMENTS

| | | | |
|---|---|---|---|
| 2,074,463 | 3/1937 | Davis | 52/DIG. 8 |
| 3,217,456 | 11/1965 | Quigg et al. | 52/DIG. 8 |
| 3,445,325 | 5/1969 | Clark | 52/727 |
| 3,538,663 | 11/1970 | MacLeod | 52/727 |
| 3,570,208 | 3/1971 | Nikai et al. | 52/423 |
| 3,697,633 | 10/1972 | Edgar | 264/45.4 |
| 3,802,950 | 4/1974 | Stevens | 428/318.4 |
| 3,890,415 | 6/1975 | Hull | 52/309 |
| 3,922,828 | 12/1975 | Patton | 52/727 |
| 3,949,529 | 4/1976 | Porter | 52/281 |
| 4,072,788 | 2/1978 | Herweg et al. | 428/139 |
| 4,112,646 | 9/1978 | Clelland | 52/372 |
| 4,147,818 | 3/1979 | Hatfield | 264/338 |
| 4,284,447 | 8/1981 | Dickens et al. | 156/78 |
| 4,470,234 | 9/1984 | Rosner | 52/282 |

FOREIGN PATENT DOCUMENTS

| | | |
|---|---|---|
| 2515597 | 10/1976 | Fed. Rep. of Germany . |
| 2854449 | 6/1980 | Fed. Rep. of Germany . |
| 1113389 | 5/1968 | United Kingdom . |
| 1329094 | 9/1973 | United Kingdom . |

*Primary Examiner*—Thurman K. Page
*Attorney, Agent, or Firm*—Simmons, Perrine, Albright & Ellwood

[57] ABSTRACT

Soffits for interior construction purposes are preformed from U-shaped foam material having inset furring strips for attaching the soffits to walls and/or ceilings and, in some cases, for also hanging cabinets from the soffits. The preformed soffits are brought to the job site, quickly cut to length, fastened and/or glued in place, and then covered with plasterboard before the cabinets are mounted below.

15 Claims, 4 Drawing Figures

U.S. Patent   Apr. 29, 1986   Sheet 2 of 2   4,584,807
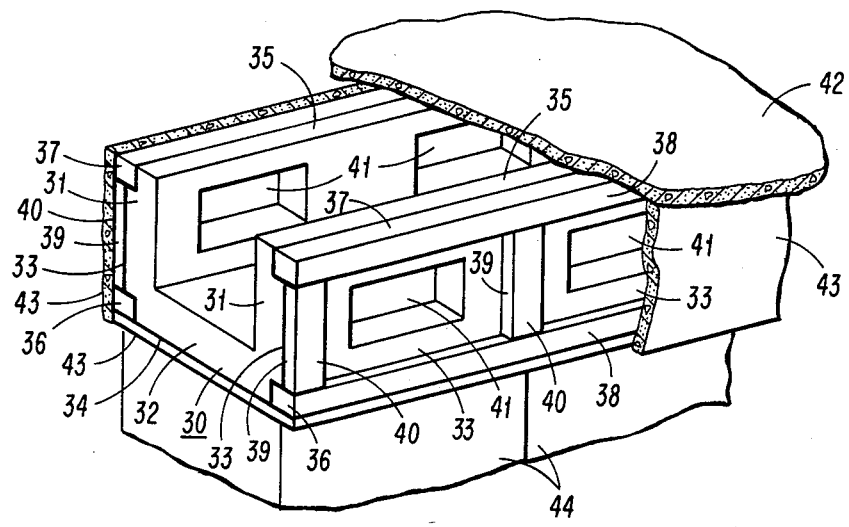
FIG 2
FIG 4
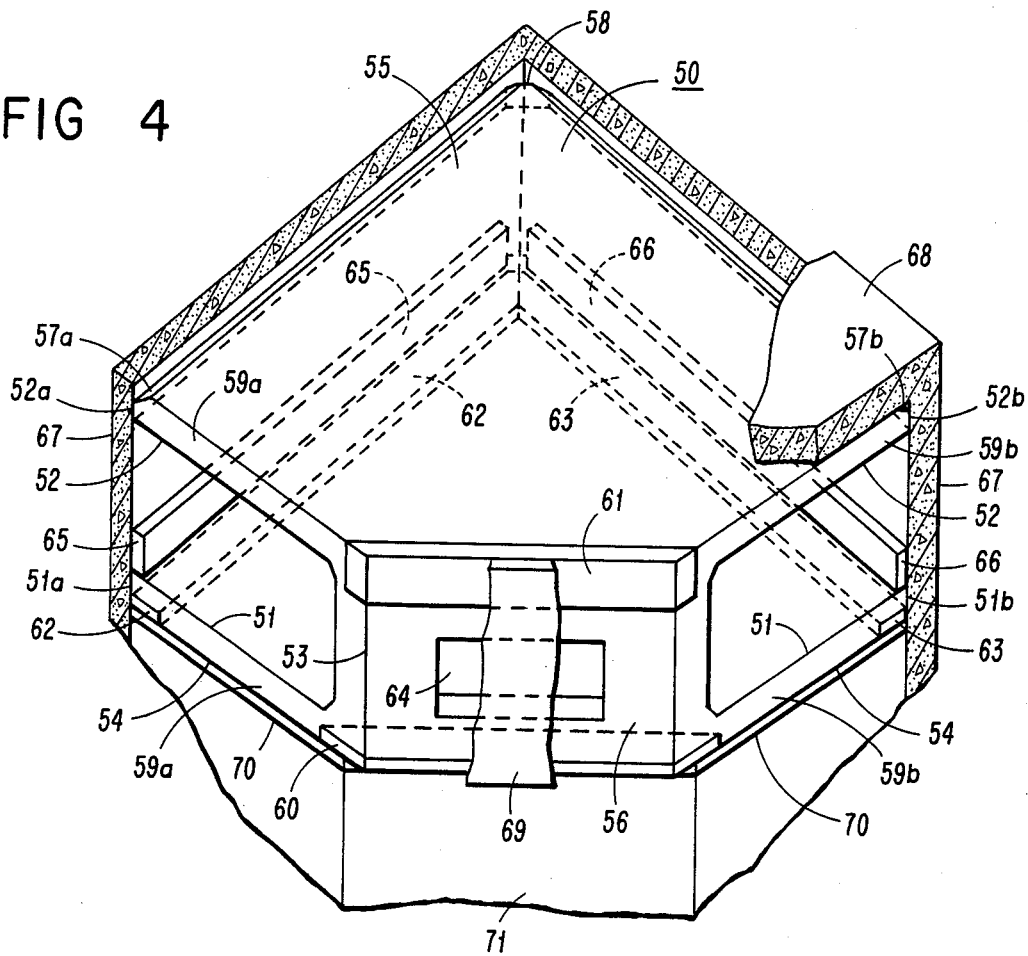

COMPOSITE SOFFIT OF PLASTIC MATERIAL AND FURRING STRIPS

BACKGROUND OF THE INVENTION

Soffits used in interior construction for enclosing the space above kitchen cabinets and the like, for example, are currently, so far as known, constructed on the job piece-by-piece. This is laborious and time consuming, requiring the measuring, cutting and assembling in place of a multitude of lengths of wooden components usually of two-by-four size, to form a framework whose outer surfaces are then covered with plasterboard such as SHEETROCK. For instance, just to frame up a straight, eight foot length of soffit can easily need three to four hours even by a skilled carpenter. To do the same for a corner is even harder and proportionately more time consuming because of the angles involved. The space enclosed by a soffit, though sometimes used for duct work and electrical cables, is otherwise useless so that the cost in time and materials is great for what largely serves only a cosmetic function.

The chief object of the present invention is thus to eliminate the need for framing in a soffit piece-by-piece on the job and hence to reduce the time and cost involved. Another object of the invention is to provide a selection of preformed soffits which can be brought to the job, easily cut to length and quickly installed.

SUMMARY OF THE INVENTION

The soffits of the invention consist essentially of eight foot lengths of U-shaped plastic material such as styrene foam having wooden furring strips inset into and glued to the foam at certain of the exterior longitudinal corners of the soffits. The furring strips serve variously as anchor points for the soffits to a ceiling, as suspension points for the cabinets below, and as nailing points for the plasterboard with which the exterior faces of the soffits are later covered in the usual manner. Four types of soffits of this general nature are provided, a wall type for fitting in the corner between a wall and a ceiling, two "island" types for suspension from a ceiling, one for a single row and the other for a double row of cabinets below, and a corner type for fitting in a corner between two walls. Preferably, the exterior vertical faces of the soffits are provided with spaced apertures along their lengths so that electrical cables can be readily threaded along the interior of the soffits after their installation. Installation involves merely cutting the soffit to proper length and then fastening it in position with nails (or other fasteners) and glue. In some cases wall or ceiling cleats are also necessary. Typically, no more than about a half hour should be required to install an eight foot soffit of the invention, a great saving compared with framing up a soffit in the current manner.

Other features and advantages of the invention will appear from the drawings and the more detailed description which follows.

BRIEF DESCRIPTION OF THE DRAWINGS

FIG. 2 is an isometric view of a single "island" type soffit according to the invention shown installed to a ceiling, certain portions being broken away for illustrative purposes.

FIG. 4 is an isometric view of a corner type soffit according to the invention shown installed in a corner between two walls, certain portions being broken away for illustrative purposes.

DETAILED DESCRIPTION OF THE PREFERRED EMBODIMENT

Figure 1:
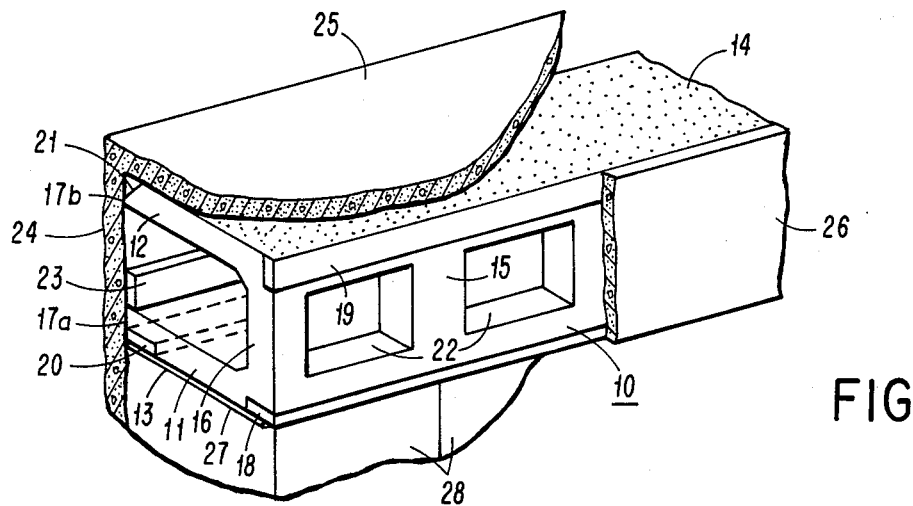
FIG. 1 is an isometric view of a wall type soffit according to the invention shown installed in the corner between a wall and ceiling, certain portions being broken away for illustrative purposes.

Turning first to FIG. 1 the bulk of the wall type soffit consists of an integral length of styrene foam 10 of rectangular U-shaped configuration in cross-section, a suitable foam being one pound STYROFOAM, which may be hot wire cut in well-known manner from 48"×48"×96" blocks in which such foam is commercially available. By judicious planning of the cuts each such block will yield several such lengths. The legs 11 and 12 of each length of foam 10 have exterior parallel planar surfaces 13 and 14 which intersect at right angles the exterior planar surface 15 of the base 16. The longitudinal outer end surfaces 17a, 17b of the legs 11 and 12 are also planar and lie in a common lane parallel to the base surface 15. The exterior longitudinal corners of the foam 10 at the junctures between the legs 11, 12 and the base 16, and the outer, longitudinal exterior corner of the leg 11, are formed by wooden furring strips 18, 19 and 20 extending the length of the foam 10. The furring strips 18, 19 and 20 are disposed as shown in FIG. 1, being preferably inset into and glued to the foam by virtue of recesses cut during the shaping of the foam 10, so that their respective exterior surfaces form portions of the leg surfaces 13, 14 and 17a and the base surface 16. The exterior longitudinal corner of the leg 12 is beveled at a 45 degree angle as shown at 21, and the base 16 may be apertured at regular spaced intervals 22 along its length.

The foam 10 is dimensioned so that the soffit will readily accommodate standard cabinets or the like. For kitchen cabinets the length of the legs 11 and 12 may be 12⅛ inches, the height of the base 16, 11⅛ inches, and the thickness of the foregoing 1½ inches. The furring strips 18, 19 and 20 may be each 2½" by ¾" in cross-section. As previously mentioned the soffits are provided in convenient preformed eight-foot lengths which are readily transported to the job site.

Installation is a simple, straightforward task. First a cleat 23 is nailed to the wall 24 at a proper distance from the ceiling 25. One or more soffits are then cut to proper length and the surfaces 14 and 17b of the leg 12 coated with a suitable adhesive. The soffit length or lengths are then placed in position as shown in FIG. 1 and held against the ceiling 25 by appropriate braces against the floor. Nails or other fasteners are then driven up through the furring strip 20 into the wall cleat 23, and the adhesive left to dry overnight before the braces are removed. If the foregoing installation is done near the end of the working day, no time is lost while the adhesive dries. Then the leg and base surfaces 13 and 15 are covered with plasterboard 26 and 27 nailed into the furring strips 18, 19 and 20. Finally, after finishing off the plasterboard 26 and 27 in the usual dry-wall manner, the cabinets, indicated at 28, are positioned and secured to the wall 24.

The single "island" type soffit shown in FIG. 2 is similar in many respects to the wall type. It also includes an integral, U-shaped length of foam 30 cut in the manner of the foam 10 except that the legs 31 and base 32 are thicker. The exterior surfaces 33 of the legs 31 are at right angles to the exterior surface 34 of the base 32, the surfaces 33 and 34 also being planar as are the longitudinal leg outer end surfaces 35 which lie in a common plane parallel to the base surface 34. The four exterior longitudinal corners of the legs 31 and base 32 receive two pairs of wooden furring strips 36 and 37 glued to and partially inset into the foam 30, exterior surfaces of the strips 36 and 37 forming portions of the base surface 34 and the leg end surfaces 35. The remaining longitudinal exterior surfaces 38 of the furring strips 36 and 37 stand proud of and parallel to the leg surfaces 33, and between respective pairs of the strips 36 and 37 of each leg 31 are disposed transverse connecting blocks 39 at regular spaced intervals along the foam 30, the exterior surfaces 40 of the blocks 39 being flush with the furring strip surfaces 38. The blocks 39 are glued to the foam 30 and the furring strips 36 and 37, the latter in turn being also nailed into the blocks 39. One or both of the legs 31 may be provided with apertures 41 spaced regularly between the blocks 39.

In the single "island" type, which may be also preformed in eight-foot lengths, the legs 31 and base 32 may be each three inches thick and the height between the surfaces 34 and 35, 11⅛ inches, the overall width between the block surfaces 40 being 13¼ inches. The furring strips 36 and 37 may be 1½ inch square stock and the blocks 39 2¼ inches wide and ¾ inches thick. Installation involves bracing the soffit in location against the ceiling 42 and then nailing or screwing up through the furring strips 37 into the joists above if the latter run transversely of the soffit. If instead the joists run parallel to the soffit, then in the case of new construction 2×4 bridges may be inserted between adjacent joists above the intended location of the soffit to provide anchor points for the latter before the ceiling is covered with plasterboard. In the case of remodeling construction it may be necessary to cut up into the ceiling to install the bridges except perhaps if a single joist falls midway between the legs 31, in which case short 2×4 cleats extending transversely between the inner faces of the legs 31 can be placed against the ceiling and fastened up into that joist, the furring strips 37 then being nailed into the ends of the cleats. The foregoing requires extra time and effort, it is true, but the same would also be necessary were the soffit constructed piece-by-piece in the current manner. The exterior faces of the soffit are then covered with plasterboard 43 and the cabinets 44 hung from the furring strips 36.

Figure 3:
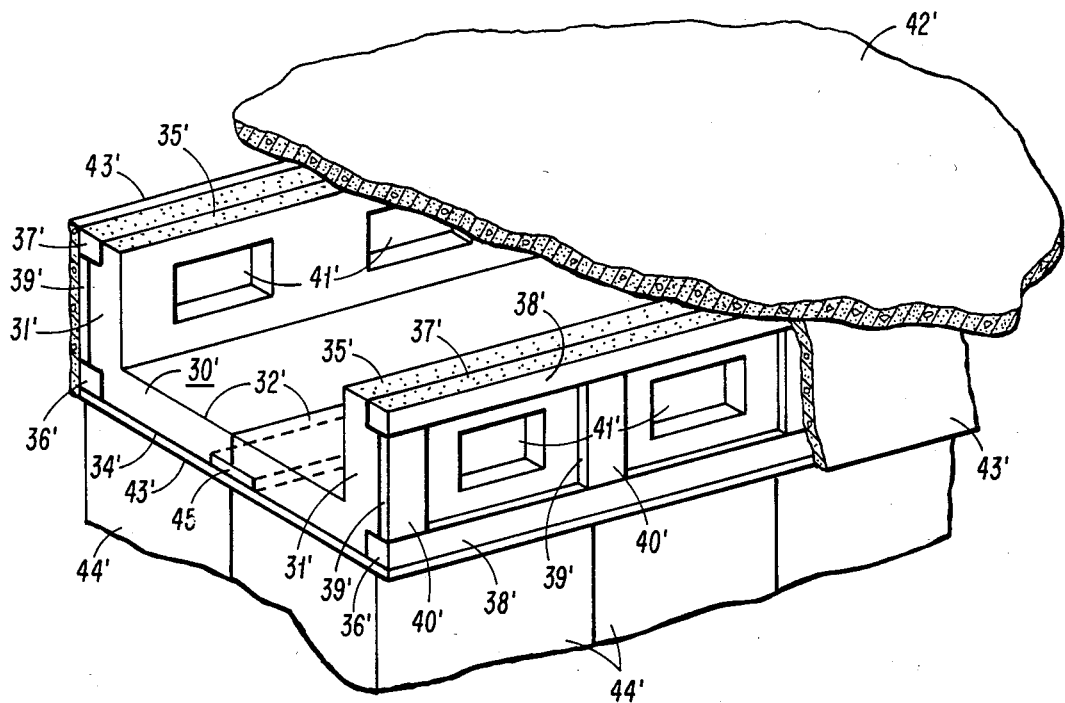
FIG. 3 is an isometric view of a double "island" type soffit according to the invention shown suspended from a ceiling, certain portions being broken away for illustrative purposes.

The double "island" type is very similar to the single and equivalent parts have been given primed reference numerals in FIG. 3. The difference is that, for economy of production, the foam 34' comprises two integral L-shaped pieces joined by glue to form the base 32', an additional furring strip 45 being inset and glued into the base surface 34' at the juncture between the two parts of the base 32' in order to provide, together with the furring strips 36', attachment points for the double row of cabinets 44. The blocks 39 and 39' are employed in both "island" types to relieve the foam of most of the weight of the cabinets. Dimension-wise the double "island" type is identical to the single except for its overall width between the block surfaces 40' which may be 25¼ inches. Installation is also identical, except that owing to the greater width of the double "island" type a pair of joists may fall between the legs 31' so that 2×4 cleats secured against the ceiling can serve in most remodeling situations.

The corner type soffit shown in FIG. 4 consists of a generally U-shaped, integral piece of foam 50 having legs 51 and 52 and base 53. The exterior surfaces 54 and 55 of the legs 51 and 52 are planar, parallel to each other and at right angles to the planar exterior surface 56 of the base 53. The respective pairs of outer end surfaces 51a, 51b and 52a, 52b of the legs 51 and 52 are equal in length and lie in two common planes at right angles to each other and to the leg surfaces 54 and 55. The outer longitudinal corners of the leg surfaces 52a, 52b are beveled at 57a and 57b and the juncture of the two pairs of leg surfaces 51a, 51b and 52a, 52b is truncated at 58. The two pairs of transverse leg end surfaces 59a and 59b are also planar and lie in two common planes at right angles to each other, the exterior leg surfaces 54 and 55 and the outer leg surfaces 51a, 52a and 51b, 52b. A pair of wooden furring strips 60 and 61 disposed as shown in FIG. 4 are inset and glued into the foam 50 at the exterior longitudinal corners between the leg surfaces 54, 55 and the base surface 56, the exterior surfaces of the furring strips 60 and 61 being flush with the foregoing leg and base surfaces as well as with the leg surfaces 59a and 59b. A second pair of wooden furring strips 62 and 63 are also inset and glued into the exterior corners between the outer leg surfaces 51a, 51b and 54, the exterior surfaces of the furring strips 62 and 63 being flush with the foregoing leg surfaces as well as with the leg surfaces 59a, 59b. Preferably the base 53 is provided with a central aperture 64.

The dimensions of the corner soffit are similar to those of the wall type having an overall height between the leg surfaces 54 and 55 of 11⅛ inches and a length of the base surface 56 of 16½ inches. The corner soffit is also installed like the wall soffit, using wall cleats 65 and 66, against the corner walls 67 and ceiling 68. Plasterboard 69 and 70 is nailed into the furring strips 60, 61, 62 and 63 and a cabinet 71 secured below to the walls 67.

The interiors of the soffits can be utilized as a duct or ducts for various purposes and the apertures 22, 41, 41' and 64 serve for access to the interiors of the soffits for threading electrical wiring or installing other fittings or components before the plasterboard is applied. As will be apparent, the preformed soffits of the invention greatly reduce the time, skill and effort required for placement compared with the current practice of building-up soffits piece-by-piece on the job. While the four embodiments shown and described are the preferred ones, being the best modes known of carrying out the invention, the latter is not limited to those particular embodiments. Instead, the following claims are to be read as encompassing all adaptations and modifications of the invention falling within its spirit and scope.

I claim:

1. A preformed, composite soffit comprising a length of plastic material having a pair of legs and a connecting base to provide a soffit of generally U-shaped configuration in cross-section, the legs having exterior first parallel planar surfaces forming the outer side faces of the legs and the soffit and exterior second planar surfaces at right angles to the first surfaces forming the longitudinal outer end faces of the legs and the soffit, the first surfaces intersecting at right angles an exterior third planar surface parallel to the second surfaces and forming the outer side face of the base and the soffit, the two exterior longitudinal corners of the soffit at the juncture between the first and third surfaces being formed by a first pair of furring strips rectangular in cross-section, the furring strips extending the length of the base and secured to said material, exterior surfaces of the furring strips forming portions of respective ones of said first and third surfaces of the legs and the base.

2. The soffit of claim 1 wherein said second surfaces of the legs are parallel to said third surface of the soffit and lie in a common plane.

3. The soffit of claim 2 wherein the exterior longitudinal corner at the juncture between the first and second surfaces of one of the legs is also formed by a third furring strip rectangular in cross-section extending the length of the soffit and secured to said material, exterior surfaces of the third furring strip forming portions of said first and second surfaces of said one leg.

4. The soffit of claim 3 wherein all the furring strips are inset into said materials such that said first, second and third surfaces of the soffit also include surface portions of said material, and wherein said length of material is an integral member.

5. The soffit of claim 4 wherein the base of the soffit includes a series of access apertures therethrough spaced lengthwise along the soffit.

6. The soffit of claim 5 wherein the exterior longitudinal corner at the juncture between the first and second surfaces of the other of the legs is beveled.

7. The soffit of claim 2 wherein the exterior longitudinal corners at the junctures between the first and second surfaces of both legs are formed by a second pair of furring strips rectangular in cross-section extending the length of the soffit and secured to said material, exterior surfaces of the second pair of furring strips forming portions of said first and second surfaces of the two legs.

8. The soffit of claim 7 wherein both pairs of furring strips are inset into said material such that said second and third surfaces of the soffit include surface portions of said material, and wherein said surfaces of the furring strips forming portions of said soffit first surfaces are spaced outwardly from said material, and including connecting members spaced along the exterior of both legs of the soffit, the connecting members extending transversely between respective ones of the first and second pairs of furring strips and secured thereto and to said material, the connecting members having exterior surfaces forming the remainder of said first surfaces of the soffit.

9. The soffit of claim 8 wherein at least one of the legs of the soffit includes a series of access apertures therethrough spaced lengthwise along the soffit and between the connecting members.

10. The soffit of claim 9 wherein said length of material is an integral member.

11. The soffit of claim 8 wherein said length of material comprises two integral L-shaped pieces of said material joined along corresponding edges to form the base of the soffit, the juncture between said pieces including a fifth furring strip rectangular in cross-section extending the length of the soffit, the fifth furring strip being inset into and secured to each of said pieces and having an exterior surface forming a portion of said third surface of the soffit.

12. The soffit of claim 11 wherein each leg of the soffit includes a series of access apertures therethrough spaced lengthwise along the soffit and between the support blocks.

13. The soffit of claim 1 wherein each of the legs includes a pair of said soffit second surfaces, corresponding ones of said second surfaces of the legs lying in two common planes at right angles to each other, and wherein the soffit includes fourth and fifth exterior planar surfaces at right angles to each other and to respective ones of said two common planes, said fourth and fifth surfaces intersecting and forming opposite ends of said third surface of the soffit.

14. The soffit of claim 13 wherein the two exterior longitudinal corners at the juncture between said first surface and said two second surfaces of one of the legs is also formed by a third pair of furring strips rectangular in cross-section extending the lengths of said two second surfaces of said one leg and secured to said material, exterior surfaces of the third pair of furring strips forming portions of said first and said two second surfaces of said one leg.

15. The soffit of claim 14 wherein all the furring strips are inset into said material such that said first surfaces of the legs, said two second surfaces of said one leg, and said third surface of the soffit also include surface portions of said material, and wherein said length of material is an integral member.

* * * * *